(12) United States Patent
Alary et al.

(10) Patent No.: US 8,323,792 B2
(45) Date of Patent: Dec. 4, 2012

(54) SPHERICAL CORUNDUM PARTICLES, BASED ON FUSED ALUMINUM OXIDE AND A METHOD FOR PRODUCING SAID PARTICLES

(75) Inventors: Jean-André Alary, L'Isle sur la Surgue (FR); Sebastian Sachse, Villach (AT)

(73) Assignee: Center for Abrasives and Refractories Research & Development C.A.R.R.D. GmbH, Villach (AT)

(*) Notice: Subject to any disclaimer, the term of this patent is extended or adjusted under 35 U.S.C. 154(b) by 955 days.

(21) Appl. No.: 11/992,267

(22) PCT Filed: Sep. 13, 2006

(86) PCT No.: PCT/EP2006/008918
§ 371 (c)(1),
(2), (4) Date: Feb. 17, 2009

(87) PCT Pub. No.: WO2007/033787
PCT Pub. Date: Mar. 29, 2007

(65) Prior Publication Data
US 2009/0162656 A1    Jun. 25, 2009

(30) Foreign Application Priority Data
Sep. 21, 2005   (DE) .................. 10 2005 045 180

(51) Int. Cl.
*B32B 5/16*    (2006.01)

(52) U.S. Cl. .......... 428/402; 428/403; 427/212; 501/84; 501/153

(58) Field of Classification Search ............... 428/402, 428/403; 427/212; 501/84, 153
See application file for complete search history.

(56) References Cited

U.S. PATENT DOCUMENTS

| | | | |
|---|---|---|---|
| 1,871,792 A * | 8/1932 | Horsfield | 423/133 |
| 1,871,793 A | 8/1932 | Horsfield | 423/625 |
| 2,261,639 A | 11/1941 | Benner et al. | 428/402 |
| 2,340,194 A * | 1/1944 | McMullen | 501/80 |
| 4,177,235 A | 12/1979 | Neidhardt et al. | 264/140 |
| 4,952,389 A * | 8/1990 | Szymanski et al. | 423/625 |
| 5,340,781 A | 8/1994 | Oda et al. | 501/127 |
| 6,613,114 B1 * | 9/2003 | Alary | 51/309 |

FOREIGN PATENT DOCUMENTS

| | | |
|---|---|---|
| DE | 690 05 975 T2 | 6/1994 |
| EP | 1 157 077 B1 | 8/2002 |
| FR | 2 789 688 A1 | 8/2000 |
| JP | 53-079797 | 7/1978 |
| JP | 01-131079 | 5/1989 |

* cited by examiner

*Primary Examiner* — Leszek Kiliman
(74) *Attorney, Agent, or Firm* — Finnegan, Henderson, Farabow, Garrett & Dunner, L.L.P.

(57) ABSTRACT

A method is provided for manufacturing spherical corundum grains having a bulk density between 1.5 kg/L and 2.5 kg/L, with aluminum oxide being melted in an electric arc furnace with the addition of 0.1 to 1% quartz sand, the melt being poured in a pouring quantity of less than 100 kg/min, and the pouring stream being blown using compressed air at a pressure between 3 to 10 bar.

11 Claims, 1 Drawing Sheet

SPHERICAL CORUNDUM PARTICLES, BASED ON FUSED ALUMINUM OXIDE AND A METHOD FOR PRODUCING SAID PARTICLES

CROSS-REFERENCE TO RELATED APPLICATIONS

Pursuant to 35 U.S.C. §371, this application is a National Stage filing of PCT Application No. PCT/EP2006/008918, filed Sep. 21, 2006, and published by WIPO under Publication No. WO 2007/033797; said PCT application claims priority to German Patent Application No. 10 2005 045 180.2 filed Sep. 21, 2005.

FIELD OF THE INVENTION

The present invention relates to spherical corundum grains based on fused aluminum oxide, having a spherical diameter between 0.001 and 5 mm, a maximum sodium oxide content of 0.5% by weight, and a maximum titanium oxide content of 0.5% by weight, and to a method for the manufacture thereof.

BACKGROUND OF THE INVENTION

Spherical corundum has been known for approximately 75 years, and has been commercially manufactured for approximately 30 years. U.S. Pat. No. 1,871,792 and U.S. Pat. No. 1,871,793 describe blowing of a pouring stream of liquid corundum under reducing conditions, using compressed air or steam. Hollow corundum spheres having a diameter of approximately 0 to 5 mm are obtained. All significant steps of the manufacturing process, still in use today, have previously been described in the above-referenced U.S. patents.

Hollow spherical corundum is primarily used as a fire-resistant material because it has very low thermal conductivity on account of the air spaces incorporated in the spheres. Hollow spherical corundum is also used as a filter medium for hot, chemically corrosive gases and liquids.

In addition to hollow spheres, however, more compact spheres having a high mechanical resistance to pressure, impact, and abrasion are also of technical interest.

The physical properties of spherical corundum are characterized chiefly by the sphere size (spherical diameter), spherical wall thickness, and the crystallite size of the aluminum oxide primary crystals from which the corundum sphere is produced.

Depending on the use, quite different requirements are imposed on the properties of spherical corundum. Thus, numerous attempts have been described in the past for influencing the properties of spherical corundum by varying the raw material used or additives in the melt, or by modifying the casting technique (pouring quantity, manipulation of the pouring stream, air or steam pressure, nozzle shape, etc.).

The manufacture of compact aluminum oxide spheres by blowing is described in U.S. Pat. No. 2,261,639, in which compact spheres are obtained by addition of 1 to 10% sodium oxide in the melt and subsequent blowing. U.S. Pat. No. 2,340,194 describes the addition of 1 to 1.5% titanium oxide in the melt, resulting in pressure-resistant hollow spheres having relatively thick walls. However, the aluminum oxide spheres manufactured according to this method have the disadvantage that they contain foreign ions (sodium, titanium) as impurities. This may be disadvantageously noticeable when these materials are used as shot-blasting abrasives because the foreign ions can result in undesired reactions with the surface to be treated. In the case of sodium oxide as an impurity, sodium aluminate may be formed which has only a slight abrasive effect.

EP 1 157 077 describes the manufacture of polycrystalline abrasive grains, with the liquid corundum being poured and the cooling thereof being assisted by dispersion of the fused aluminum oxide into fine drops, using ultrasound. Compact particles having an average diameter of less than 1 mm are obtained in this manner. Aside from the fact that the particles are relatively small, which limits their area of application, the method is comparatively complicated, and the use of ultrasound is not suitable for mass production.

Thus, there is a continued need for more compact aluminum oxide spheres which can be manufactured by an easily performed, effective method.

SUMMARY OF THE INVENTION

The object of the invention, therefore, is to provide substantially compact aluminum oxide spheres and a method for their manufacture which does not have the disadvantages of the prior art.

This object is achieved by means of spherical corundum grains having the features of claim 1, and by a method having the features of claim 6. Modifications of the inventive idea are the subject of subclaims 2 through 5.

BRIEF DESCRIPTION OF THE DRAWINGS

The accompanying drawings, which are incorporated in and form a part of the specification, illustrate the embodiments of the present invention and, together with the following description, serve to explain the principles of the invention. For the purpose of illustrating the invention, there are shown in the drawings embodiments which are presently preferred, it being understood, however, that the invention is not limited to the specific instrumentality or the precise arrangement of elements or process steps disclosed.

DETAILED DESCRIPTION OF THE PREFERRED EMBODIMENTS

Surprisingly, it has been found that aluminum oxide spheres having a diameter between 0.001 and 5 mm, a maximum proportion of sodium oxide of 0.5% by weight, a maximum proportion of titanium oxide of also 0.5% by weight, and an aluminum oxide content of greater than 98% by weight as well as a bulk density between 1.5 kg/L and 2.5 kg/L may be obtained by melting aluminum oxide with the addition of 0.1 to 1% by weight silicon oxide under oxidizing conditions in an electric arc furnace, and then pouring the molten aluminum oxide in a pouring quantity of less than 100 kg/min and blowing the pouring stream with air at a pressure of 3 to 10 bar.

In comparison, the bulk density of commercially available hollow spherical corundum is between 0.5 and 1.2 kg/L.

It has also been found to be advantageous to use only air in blowing the liquid corundum, and to omit the addition of water.

The addition of $SiO_2$ influences primarily the viscosity of the melt, with $SiO_2$ being used as a fluxing agent and reducing the viscosity of the melt. It has also been found that the color of the product may also be influenced by the $SiO_2$ content in the melt. Whereas products having an $SiO_2$ content of 0.8% by weight have a pure white appearance, the products having an $SiO_2$ content of less than 0.5% by weight show a distinct yellow color. The effect of the $SiO_2$ on the density of the product is less pronounced, and is presumably based solely on the fact that the production conditions are enhanced by improved flowability with the addition of $SiO_2$, and therefore a higher product density is also obtained when the proportion of $SiO_2$ is greater.

However, the $SiO_2$ content appears to have a relatively large influence on the physical properties of the spherical corundum. Thus, the highest values for grain fracture strength have been found for an average $SiO_2$ content of 0.4%. This may be attributable to the fact that a relatively high proportion of micropores, having a pore volume smaller than 3 μm relative to the total pore volume, is found in a material that has been fused under these conditions. This high proportion of uniformly distributed micropores, i.e., the low proportion of large pores, results in a corresponding strength of the spherical corundum which may be numerically expressed by measurement of the grain fracture strength.

Compared to the commercial hollow spherical corundum, for which the relative volume of micropores smaller than 3 μm is approximately 0.5%, for the spherical corundum according to the invention which has been fused with 0.4% $SiO_2$ a relative proportion of micropores of approximately 13% is obtained with a total pore volume of approximately 40%. Studies have shown that the relative volume of micropores smaller than 3 μm is correlated with the grain fracture strength. Thus, the highest grain fracture strength has been found for materials having a high proportion of micropores for the same total pore volume.

Figure 1:
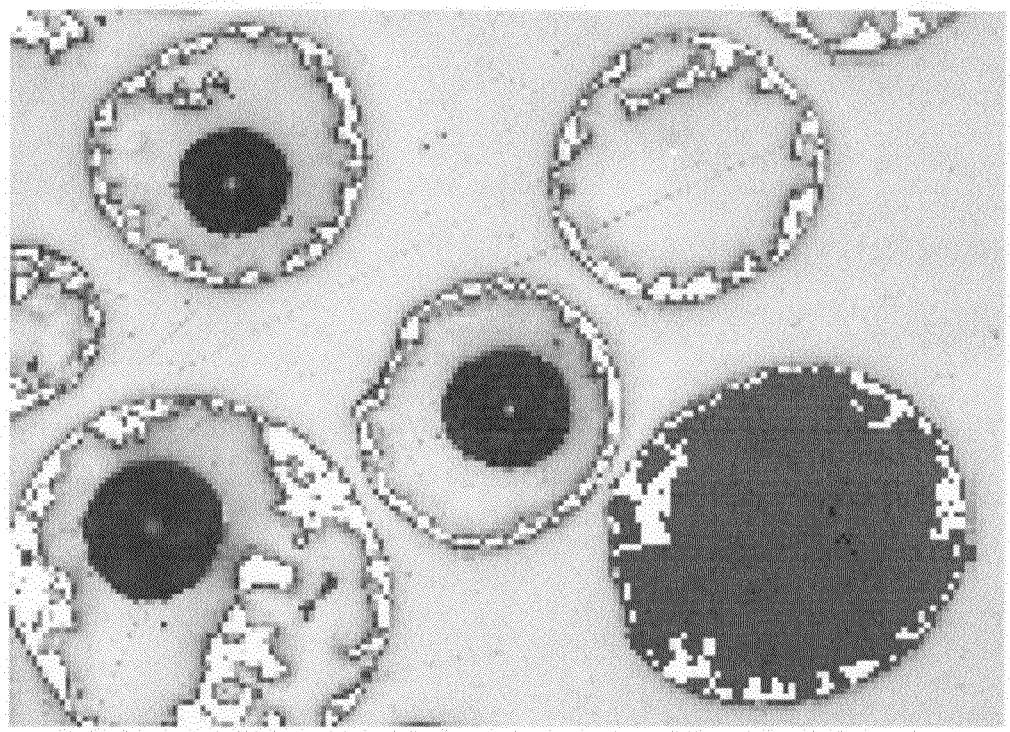
FIG. 1 is an image of a conventional hollow spherical corundum taken by a scanning electron microscope.
Figure 2:
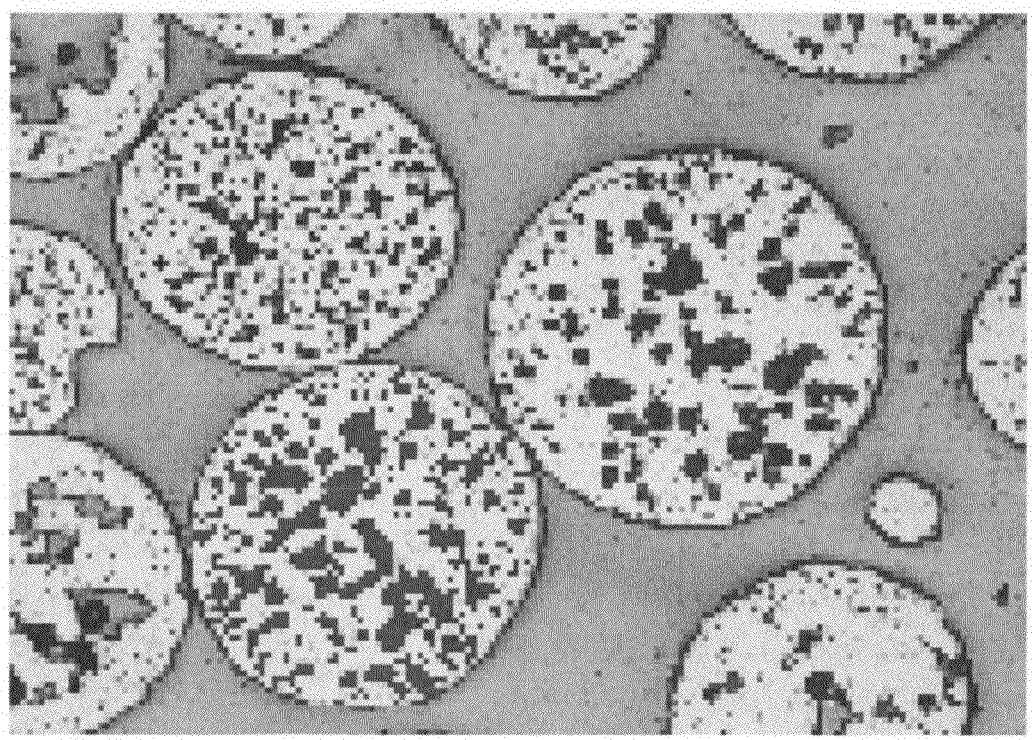
FIG. 2 is an image of a spherical corundum in accordance with the subject invention taken by a scanning electron microscope.

The difference between the commercially available hollow spherical corundum and the spherical corundum grains according to the invention is illustrated particularly clearly by digital image analysis. FIG. 1 shows the micrograph of conventional hollow spherical corundum, having a pore volume of approximately 90%. The thin walls of the hollow spherical corundum are very apparent. In comparison, FIG. 2 shows the micrograph of spherical corundum according to the invention, having a pore volume of approximately 40%. It can be easily seen that the pores are essentially homogeneously distributed over the entire sphere. Depending on the manufacturing conditions, the pore volume for the spherical corundum according to the invention is between 25 and 50%, whereas the pore volume of the conventional spherical corundum is between 85 and 95%.

The low specific surface of the compact spherical corundum is particularly noteworthy. Thus, depending on the spherical diameter, specific surfaces between 0.005 and 0.05 $m^2/g$ are found. In comparison, the specific surfaces for conventional hollow spherical corundum are approximately a power of ten greater, ranging from 0.05 to 0.5 $m^2/g$, the specific surface decreasing with increasing particle diameter. The specific surface is measured according to the BET method.

FIGS. 1 and 2 illustrate the difference in structure of the spherical corundum grains according to the invention compared to conventional spherical corundum. This difference may also be documented using physical measurement methods. A particularly suitable measurement method is the determination of grain fracture strength according to Vollstädt. This method involves the computerized testing of individual grain fracture strength, with size and shape analysis of the individual grains.

The main components of the apparatus are a pneumatic means of applying force, a precision force sensor, a stepping motor, and a specialized microscope having a built-in camera and lighting as well as an additional observation camera. The functional principle of the measurement method is based on the fact that a certain number of particles are placed on a carrier strip, which is then passed by the measuring instrument. By use of the microscope the size, shape, and position parameters of the particles are determined, and the particles are then transported to a precisely defined location between superhard stamps. A constantly increasing force then acts on the individual grains until the grains fracture. This fracture force is determined and is added to the list of previously measured parameters for the grains.

According to the method described above, a grain fracture strength between 1 and 5 N was determined for the conventional spherical corundum of grit size 36, whereas for the compact corundum grains according to the invention a grain fracture strength of greater than 20 N, preferably greater than 40, was found.

The invention is explained below, with reference to several selected examples.

EXAMPLE 1-3

A mixture of 1000 kg aluminum oxide and 8 kg, 4 kg, or 1 kg, respectively, quartz sand was melted in a capped electric arc furnace (tilting furnace) having a diameter of approximately 1.8 m, power of 1.2 MW, and voltage of 172 V. As soon as the mixture was completely liquid, the furnace was tilted and the liquid corundum was poured through a casting spout. During the pouring, the pouring stream was blown by use of a blowing device essentially comprising a lance-shaped tube provided on its tip with a nozzle and also with a compressed air feed, with the nozzle being directed onto the pouring stream, the compressed air flow being opened, and the pouring stream of the liquid corundum being dispersed. An air pressure of 8 bar was used. The corundum spheres thus obtained were collected in a so-called blowing chamber having a base composed of water-cooled steel plates. From there, the spheres were air-conveyed into a cooling tube connected to the blowing chamber. The corundum spheres were then transported to a sieving station and sieved into individual fractions according to their diameter. The physical data for the corundum spheres thus obtained are summarized below in Table 1. Conventional hollow spherical corundum is listed for comparison.

TABLE 1

|  |  | Comparison | Example 1 | Example 2 | Example 3 |
|---|---|---|---|---|---|
| Chemical analysis (weight %) | $Al_2O_3$ | 98.8 | 99.2 | 99.6 | 98.8 |
|  | $SiO_2$ | 0.8 | 0.4 | 0.1 | 0.8 |
| Bulk density (kg/L) | 0-0.5 mm | 0.8-1.1 | 2.04 | 2.11 | 2.09 |
|  | 0.5-1 mm | 0.65-0.85 | 1.86 | 1.91 | 1.95 |
|  | 1-2 mm | 0.55-0.80 | 1.78 | 1.96 | 1.93 |
| Specific surface (BET) ($m^2/g$) | 0-0.5 mm | 0.247 | 0.038 | 0.078 | 0.154 |
|  | 0.5-1 mm | 0.078 | 0.020 | 0.036 | 0.024 |
|  | 1-2 mm | 0.037 | 0.009 | 0.024 | 0.019 |
| Grain fracture strength (Vollstädt) (N) |  | 2.5 | 40.1 | 15.8 | 33.1 |
| Grain distribution (%) | 0-0.5 mm | 19.4 | 44.4 | 35.1 | 53.2 |
|  | 0.5-1 mm | 27.3 | 26.6 | 30.4 | 26.9 |
|  | 1-2 mm | 28.4 | 19.7 | 24.9 | 14.0 |
|  | 2-5 mm | 24.9 | 9.3 | 9.6 | 5.9 |
| Pore volume (%) |  | 90 | 39 | 43 | 27 |

TABLE 1-continued

|  | Comparison | Example 1 | Example 2 | Example 3 |
|---|---|---|---|---|
| Relative volume of micropores <3 μm (%) | 0.5 | 13.1 | 3.7 | 7.9 |

As can be seen from the examples in Table 1, the proportion of $SiO_2$ primarily influences the grain distribution and the grain fracture strength. The higher the proportion of $SiO_2$, the less viscous the melt becomes, and the finer the corundum particles which are obtained during blowing. On the other hand, the bulk density and the specific surface appear to be relatively unaffected by the $SiO_2$ content. The dependence of the relative volume of micropores on the $SiO_2$ content is clearly seen, and the grain fracture strength is apparently affected as well.

It can be further seen from Table 1 that the bulk density and the specific surface decrease with increasing sphere size. The influence of $SiO_2$ on the grain distribution is noteworthy.

Thus, for an $SiO_2$ proportion of 0.8% in the manufacture of compact spherical corundum using the method according to the invention, a proportion of more than 50% in the grain fraction of 0 to 0.5 mm is obtained.

EXAMPLE 4

Blast Test

One application of interest for compact spherical corundum is sandblasting. In order to test the performance of the spherical corundum, the materials from Examples 1 through 3 were compared to conventional, commercially available shot-blasting abrasives. The following test conditions were observed:

A steel plate (material: ST37) was shot-blasted with 5 kg of blasting material, using an 8-mm nozzle at a pressure of 4.5 bar and a blast angle of approximately 60° at a distance of 25 mm. The surface power, the dust formation, the grain loss, the surface roughness, and the surface structure were measured.

The surface power is characterized by the quantity of shot-blasting abrasive required to homogeneously blast a 1-m² ST37 steel plate. In other words, the lower the value, the less blasting material that is consumed, and the greater the surface power of the blasting material.

The grain fraction of 0.5 to 1 mm was used in the test. This grain fraction was compared to commercially available Zirblast® blasting beads (31% $SiO_2$+61% zirconium oxide, 425 to 500 μm fraction) and Sovitec glass beads (425 to 800 μm fraction). The test results are summarized in Table 2.

TABLE 2

|  | Example 1 | Zirblast ® | Sovitec glass beads |
|---|---|---|---|
| Amount removed, kg/m² | 22 | 17 | 22.8 |
| Dust formation | None | None | Slight |
| Grain loss | 30 | 6 | 22 |
| Surface roughness | 6.3 | 4.9 | 5.8 |

Table 2 shows that the compact corundum spheres according to the invention exhibit a surface power comparable to that of the glass beads. The advantage of the corundum spheres according to the invention compared to the glass beads is that no quartz-containing dust hazardous to health results from the use of the corundum spheres. Compared to the spheres containing zirconium oxide, although the corundum spheres according to the invention exhibit a lower surface power while at the same time showing considerably higher abrasion, in this case the advantage of the corundum spheres according to the invention is primarily the significantly lower cost.

A further advantage of the compact spherical corundum is that a particular texturing of the surface is achieved by the compact spherical corundum according to the invention which is characterized by slight dents and spherical impressions, for which reason the spherical corundum is particularly suited for surface finishing.

Embodiment 1: Spherical corundum grains based on fused aluminum oxide, having a spherical diameter between 0.001 and 5 mm, a maximum sodium oxide content of 0.5% by weight, and a maximum titanium oxide content of 0.5% by weight, characterized in that the spherical corundum grains has a bulk density between 1.5 kg/L and 2.5 kg/L.

Embodiment 2: Spherical corundum grains according to Embodiment 1, characterized in that the spherical corundum grains have a specific surface (BET) between 0.005 and 0.05 m²/g. (BET is a method/rule for determining the physical absorption of gas molecules on a solid surface. The BET rule was first published in an article authored by Stephen Brunauer, Paul Hugh Emmett, and Edward Teller.)

Embodiment 3: Spherical corundum grains according to the Embodiments 1 or 2, characterized in that the spherical corundum grains have a grain fracture strength (Vollstädt) of ≧20 N, preferably ≧40 N.

Embodiment 4: Spherical corundum grains according to one of the Embodiments 1 through 3, characterized in that the spherical corundum grains have a pore volume, measured using digital image analysis, of less than 50%, preferably less than 40%, particularly preferably less than 30%.

Embodiment 5: Spherical corundum grains according to one of the Embodiments 1 through 4, characterized in that for the spherical corundum grains the relative pore volume of micropores smaller than 3 μm is greater than 5%, preferably greater than 15%, relative to a total pore volume of 30-40%.

Embodiment 6: Method for manufacturing spherical corundum grains according to one of the Embodiments 1 through 5, with
 a) aluminum oxide being melted in an electric arc furnace with the addition of 0.1 to 1%, preferably 0.2 to 0.6%, quartz sand relative to the total weight of the starting materials,
 b) the melt being poured in a pouring quantity of less than 100 kg/min, and
 c) the pouring stream being blown using compressed air at a pressure between 3 and 10 bar, characterized in that the melt is carried out under oxidizing conditions.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

The invention claimed is:

1. Spherical corundum grains based on fused aluminum oxide, having a spherical diameter between 0.001 and 5 mm, a maximum sodium oxide content of 0.5% by weight, and a maximum titanium oxide content of 0.5% by weight, characterized in that the spherical corundum grains have a bulk density between 1.5 kg/L and 2.5 kg/L.

2. Spherical corundum grains according to claim 1, characterized in that the spherical corundum grains have a specific surface (BET) between 0.005 and 0.05 m²/g.

3. Spherical corundum grains according to claim 1, characterized in that the spherical corundum grains have a grain fracture strength (Vollstädt) of ≧20 N.

4. Spherical corundum grains according to claim 1, characterized in that the spherical corundum grains have a pore volume, measured using digital image analysis, of less than 50%.

5. Spherical corundum grains according to claim 1, characterized in that for the spherical corundum grains the relative pore volume of micropores smaller than 3 μm is greater than 5%, relative to a total pore volume of 30-40%.

6. Method for manufacturing spherical corundum grains according to claim 1, comprising the steps of:
   a) melting aluminum oxide in an electric arc furnace with the addition of 0.1 to 1%, preferably 0.2 to 0.6%, quartz sand relative to the total weight of the starting materials,
   b) pouring the melt in a stream at a pouring rate of less than 100 kg/min, and
   c) directing a flow of compressed air at a pressure between 3 and 10 bar at the poured stream,
   characterized in that the melt is carried out under oxidizing conditions.

7. Spherical corundum grains according to claim 3, wherein the spherical corundum grains have a grain fracture strength (Vollstädt) of ≧40 N.

8. Spherical corundum grains according to claim 4, wherein the spherical corundum grains have a pore volume, measured using digital image analysis, of less than 40%.

9. Spherical corundum grains according to claim 8, wherein the spherical corundum grains have a pore volume, measured using digital image analysis, of less than 30%.

10. Spherical corundum gains according to claim 5, wherein for the spherical corundum grains the relative pore volume of micropores smaller than 3 μm is greater than 15%, relative to a total pore volume of 30-40%.

11. The spherical corundum grains according to claim 1, wherein the spherical corundum grains have a pore volume, measured using digital image analysis, between 25% and 50%.

* * * * *